UNITED STATES PATENT OFFICE 2,530,244

PROCESS OF DEGUMMING AND BLEACHING RAMIE

Søren J. F. Jensen, Shanghai, China

No Drawing. Application November 21, 1946, Serial No. 711,478

4 Claims. (Cl. 92—17)

The present invention has for its object a process of degumming and bleaching ramie, which will be certain in its operation and will produce a high grade degummed and bleached ramie, and in which the actual fibers of the ramie will not suffer any considerable loss of strength and elasticity during the treatment, and will not be harsh or brittle.

Many processes have been heretofore proposed and patented for the degumming and bleaching of ramie, most of which processes either do not completely degum the material or cause a serious loss in the quality of the product.

In the carrying out of the present process I subject the ramie (which comes onto the market in the form of "China grass" and which usually has been dried) to a series of treatments as described below, and I obtain a fully degummed and bleached ramie which can be made up into fabrics of high quality.

1. The China grass, which may be in the dried condition or not, as desired, is first placed in an aqueous solution of an aluminum salt, of low concentration. An 0.2% solution of potassium alum is suitable but it will be understood that ammonium aluminum sulphate, sodium aluminum sulphate, aluminum sulphate can be used, or, if desired, other water-soluble salts of aluminum with mineral acids can be used. This solution may be at ordinary room temperature and the grass is preferably first made up into bundles, loosely tied. The China grass is allowed to soak in the solution, say, at room temperature for several hours and preferably over night, say, 12 to 15 hours. The alum solution dissolves out some gum, some coloring matter and allows considerable dirt, sand, clay or the like to drop out. The bundles of China grass are then taken out, freed from the main part of the solution by wringing, pressing or centrifuging, and can then be washed in water. It is well known that the aqueous solutions of the above mentioned salts of aluminum are non-alkaline in reaction, aqueous solutions of aluminum sulphate and of alums being acid to litmus.

2. The grass is then immersed in a cold 1% solution of caustic soda in water, which is then heated to boiling, and kept boiling for 2 hours. The heat is shut off and the solution, with the ramie therein, is then allowed to stand for several hours, preferably about 6 hours. The temperature of the solution will have fallen considerably during this period, e. g. to about 50° C.

The grass is then removed from the solution, and is wrung, pressed or centrifuged, then preferably washed with water to remove soluble matter. The washing can be considered as complete when the wash water flows away colorless. The excess of water can be squeezed out, wrung or centrifuged.

3. The grass is then immersed in an acid liquor such as a 0.2% solution of hydrochloric acid in water. This acid liquor is then heated to boiling and the boiling continued for about 2 hours, after which the grass is removed from the liquor, at once wrung or centrifuged or pressed and washed with water. The water washing should be continued until the wash water flows away substantially neutral. The excess water can be drained off or removed by squeezing, centrifuged or the like.

4. The ramie is then placed in an aqueous solution of an oxidizing salt, preferably a 1% solution of sodium perborate in water, this solution being preferably cold, i. e. at or below room temperature. Of the many oxidizing salts available, sodium perborate is found to be exceptionally advantageous since it is highly effective, constitutes a good bleaching agent, aids in converting insoluble gums into soluble gums, and does not injure the ramie. The sodium perborate solution is, of course, originally colorless.

Preferably the grass is kept in this solution for about 2 hours before heating of the solution is commenced. The solution is heated slowly to boiling and is kept boiling for about 2 hours. Then it is let stand for about 3 hours after discontinuing the application of heat thereto. The ramie can then be wrung or centrifuged and washed with water, until the wash water flows off substantially colorless. After boiling and after allowing to stand for 3 hours, the temperature of the bath may be about 40 to 60° C., depending upon the outside temperature.

5. The grass is then put into a weaker solution of caustic soda, e. g. a solution of 0.5% strength. This is then heated and boiled, the boiling being continued for 2 hours. Then the material is pressed, centrifuged, or wrung, washed with water until the water flows away colorless and the excess water squeezed out or centrifuged out.

6. The ramie is then put into a second acid solution, e. g. an 0.15% solution of hydrochloric acid. This mixture is heated and boiled for 2 hours, removed from the acid liquor and wrung or centrifuged, washed with water and the said water removed.

7. The ramie is then placed in a cold solution of an oxidizing salt such as a cold 0.5% solution of sodium perborate. The mixture is heated to boiling and boiling continued for about 2 hours. Then the ramie is removed from the liquor, squeezed or centrifuged, washed with cold water until all of the sodium perborate has been washed out. The excess water is pressed out and the ramie then is allowed to dry in the open air.

The resultant ramie fiber or floss is substantially pure white in color, entirely free from gum and has not been substantially injured by the chemicals, which, as will be noted, are used in the form of mild solutions. The second treatment with the caustic soda, hydrochloric acid and sodium perborate (steps 5, 6 and 7) uses the same chemicals which are used in the earlier steps 2, 3 and 4, but the solutions used in steps 5, 6 and 7 are respectively substantially weaker (of lower concentration) than in steps 2, 3 and 4.

It will be understood that the invention is not restricted to the precise concentrations of the various solutions stated as above, certain variations in the concentration of the solutions, within the scope of the appended claims, being permissible. However, it should be noted that different grades of ramie vary more or less, and it is advisable to adjust concentrations of the solutions more or less, when changing to a different supply of ramie.

It will be noted that in the above description it will be seen that the various solutions except the first are all boiled in contact with the ramie.

A great many of the prior patents on the treatment of ramie use liquors which are very much stronger than those which here are employed, and they injure the fiber substantially. Many of the previous processes do not completely remove the gum or other incrustatious material (herein called gum) and leave products which are undesirably stiff or harsh.

Not only are such hard fibers unpleasant to the touch, but they are exceedingly difficult to spin. They will soon break the ordinary cotton spinning machinery. When the fibers are completely degummed, as by the present process, they can easily be spun on cotton machinery, when cut to the same lengths as cotton fiber. This should be a great advantage and facilitate the introduction of ramie fiber into many new fields, as no new spinning machinery would be required.

The treatment with alum has a certain softening effect on the ramie fiber. This is most likely due to the alum reacting with the mineral contents of the gums and incrustations, especially the calcium salts, so that they more easily dissolve in the following processes. Alum and aluminum sulphate are used as water softeners, precipitating the soluble calcium salts as gypsum and itself being precipitated as aluminum hydroxide. The thus softened water has of course already better dissolving powers than the hard, raw water. It is possible that similar processes take place between the alum and the calcium salts of the gum, so that the calcium salts of the gum are transformed into aluminum salts, which are soluble in caustic soda solution, whereas calcium salts are not. It is a fact, that ramie floss made with the use of alum is practically ash-less, whereas floss made by my process but without alum treatment as "step 1" has a distinct ash content, especially of calcium salts.

The yield of floss is usually 70% of the raw China grass. Inferior qualities of China grass will as a rule give lower yield of floss and often, but not always, an inferior quality of floss.

The spent solutions contain all the gums, or about 30% of the raw China grass, in solution. There is no doubt, that the gums can be reclaimed. They may then be manufactured into plastics, varnishes, lacquers, etc. Another way of using the spent liquors would be to transform them by chemical or biochemical processes into other compounds such as alcohols, furfural or other solvents, which could then be isolated by distillation. No special process has yet been developed to utilise these by-products, whose value, however, may easily some day exceed the value of the floss.

I claim:

1. A process of degumming and bleaching ramie which comprises (1) soaking such ramie for at least several hours in a solution of an aluminum salt which solution is of a concentration of only a minor fraction of one percent, separating the so treated ramie and such solution from each other, (2) placing the ramie in a caustic alkali solution of about 1% concentration figured as caustic soda, boiling such solution for about two hours, and continuing contact of such ramie with such solution for a period of several hours in all, separating the so treated ramie and the said solution from each other, (3) immersing the so treated ramie in an acid solution of a concentration chemically equivalent to hydrochloric acid solution of only a minor fraction of one percent, boiling such solution for about two hours and separating the so treated ramie and the acid solution from each other, (4) treating the so treated ramie with a solution of an oxidizing salt allowing to stand for some hours, boiling for some hours, again letting stand for some hours, then separating the so treated ramie and the solution from each other, (5) then treating such ramie with a caustic alkali solution of a fraction of a percent concentration, boiling such solution and allowing the ramie and such solution to stand in contact with each other, the said second treatment with caustic alkali solution lasting for several hours in all, and separating the so treated ramie and the alkaline solution from each other, then treating said ramie with an acid solution, of an acid concentration which is substantially less than that used in the above mentioned acid treatment, and boiling said acid solution during such treatment, separating the treated ramie and the acid solution from each other, (7) and treating such ramie with an oxidizing salt solution which is of a concentration substantially lower than that used in the above mentioned treatment with solution of oxidizing salt, boiling said solution during said treatment, said treatment with dilute oxidizing salt solution lasting for several hours, separating said ramie and said solution from each other, and washing the treated ramie and drying same, whereby substantially pure and substantially bleached ramie fiber is produced.

2. A process as in claim 1 in which the caustic alkali is caustic soda, the acid is hydrochloric acid and the oxidizing salt is sodium perborate.

3. A process of degumming and bleaching ramie which comprises treating the ramie in the form of "China grass," (1) by soaking in alum solution of about 0.2% concentration, for at least several hours, then (2) placing in a caustic solution, boiling and letting stand, such treatment being continued for several hours at least, then (3) placing in hydrochloric acid of about 0.2% strength and boiling, then (4) placing in sodium perborate solution of about 1% strength and boiling, such perborate treatment being continued for several hours, then (5) placing the ramie in caustic soda solution of about 0.5% strength and boiling, such caustic soda treatment being continued for several hours, then (6) placing in hydrochloric acid of about 0.15% strength and boiling, then (7) placing in sodium perborate solution of about 0.5% strength and boiling, then washing and drying.

4. In the production of ramie fiber from China grass, the herein described improvement which comprises the treatment with several aqueous solutions, in the order stated, namely (1) soaking the China grass for a fraction of a day, and at least several hours, in a weak non-alkaline aqueous solution of an aluminum salt of a mineral acid, (2) boiling the so-treated ramie in a dilute aqueous caustic soda solution, (3) boiling the so-treated ramie in an aqueous hydrochloric acid solution of a fraction of one per cent concentration, (4) soaking and boiling the so-treated ramie in an aqueous solution of sodium perborate of about 1% strength, (5) boiling the so-treated ramie in a caustic soda solution which is materially weaker than that used in step (2) above, (6) boiling the so-treated ramie in aqueous hydrochloric acid which is materially weaker than that used in step (3) above, and (7) boiling the so-treated ramie in an aqueous sodium perborate solution which is materially weaker than that used in step (4) above, each of said aqueous solutions, and the treated ramie being substantially all separated from each other after the respective treating steps and before the next treating step.

SØREN J. F. JENSEN.

REFERENCES CITED

The following references are of record in the file of this patent:

UNITED STATES PATENTS

| Number | Name | Date |
|---|---|---|
| 786,721 | Blackmore | Apr. 4, 1905 |
| 831,621 | Mudge | Sept. 25, 1906 |
| 975,387 | Hutchinson | Nov. 8, 1910 |
| 1,425,520 | Giesler | Aug. 15, 1922 |
| 2,002,083 | Dreyfus | May 21, 1935 |
| 2,012,769 | Peufaillit | Aug. 27, 1935 |
| 2,073,682 | Chesley | Mar. 16, 1937 |
| 2,114,669 | Schneider | Apr. 19, 1938 |
| 2,150,926 | Kauffman | Mar. 21, 1939 |

FOREIGN PATENTS

| Number | Country | Date |
|---|---|---|
| 14,868 | Great Britain | June 19, 1897 |
| 277,628 | Great Britain | Oct. 11, 1928 |

OTHER REFERENCES

Chemistry of Laundry Materials by Jackman, published by Longmans Green and Co., New York (1931), pages 77 and 78.

Bleaching and Related Processes by Matthews, published by Chemical Catalog Co., New York (1921), pages 376 and 377.